No. 33,193.  
R. HALE.  
PIPE COUPLING.  
PATENTED SEPT. 3, 1861.
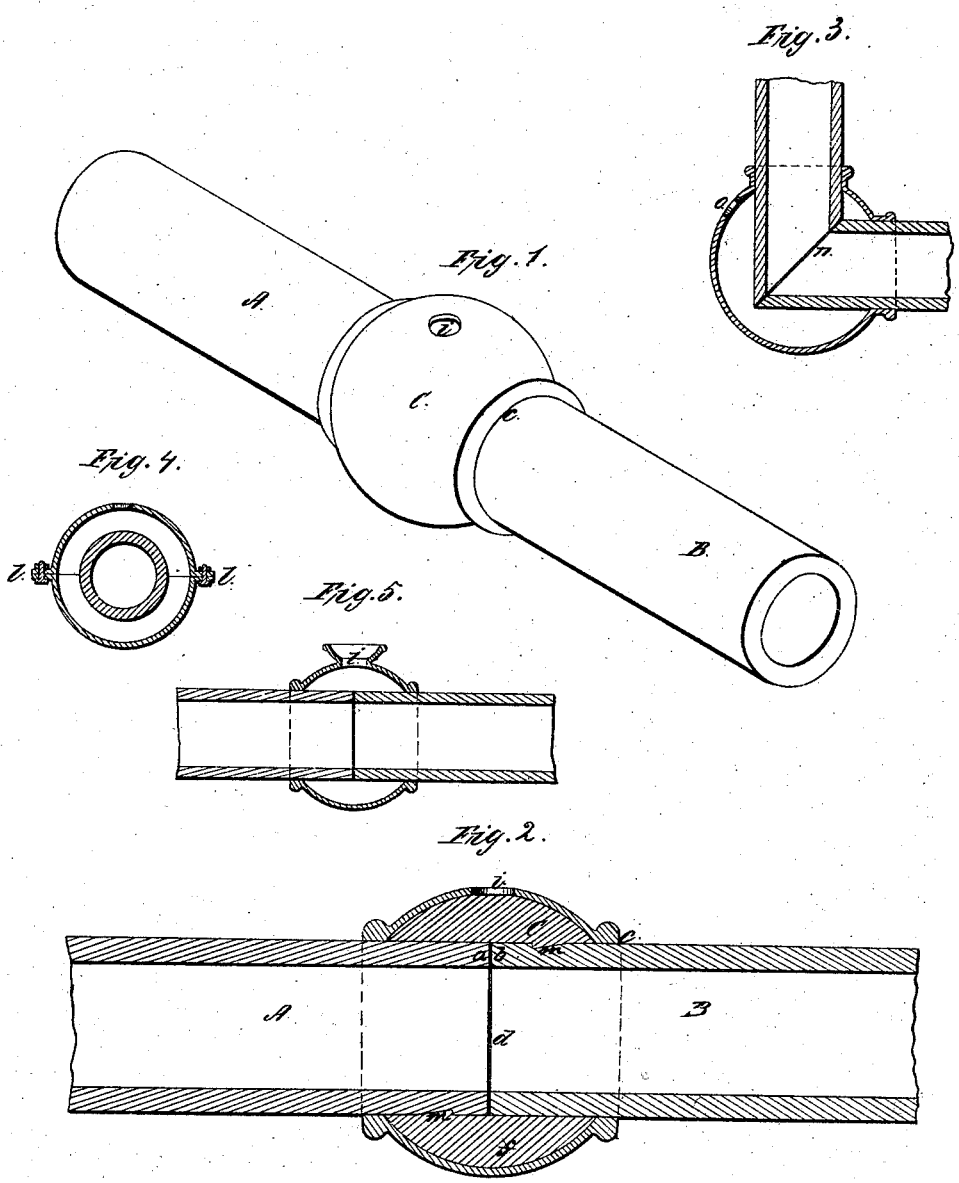

UNITED STATES PATENT OFFICE.

ROBERT HALE, OF ROXBURY, MASSACHUSETTS.

PIPE-COUPLING.

Specification forming part of Letters Patent No. 33,193, dated September 3, 1861.

*To all whom it may concern:*

Be it known that I, ROBERT HALE, of Roxbury, in the county of Norfolk and State of Massachusetts, have invented an Improved Pipe-Coupling, of which the following is a full, clear, and exact description, reference being had to the accompanying drawings, making part of this specification, in which—

Figure 1 is a view of my improved coupling connecting two short sections A and B of india-rubber water-pipe; Fig. 2, a longitudinal section through the same; Figs. 3, 4, and 5, details to be referred to.

The object of my present invention is to produce a cheap and convenient coupling for water and other pipes, which is simple and easy of application; and my invention consists of the hollow coupling C, (shown in the drawings,) which is intended to be slipped over the abutting ends of two pieces of pipe, and is then to be filled with some suitable cement, (such as sulphur or hydraulic cement,) which can be poured into it through a hole made for the purpose, and will then set or become solid and hold the ends of the pipes in position.

I am aware that cement and also lead solder have been poured around the joint where the bell-coupling has been used—that is, where the end of one pipe is entered into a bell or enlargement formed on the end of the other pipe—and also that the bell or enlargement has been cast with a recess, into which cement or solder was poured after the ends of the pipes were brought together to hold them. I wish, however, to avoid the necessity of having the end of either piece of pipe made of any particular form, as this adds to the expense of the manufacture of the pipe, and in some cases, as with the india-rubber conducting water-pipe, for which Letters Patent were granted to Charles McBurney January 11, 1859, it is not practicable, and I wish to make a firm and good joint in any position where the ends of two pieces of plain pipe are brought together end to end.

That others skilled in the art may understand and use my invention, I will proceed to describe the manner in which I have carried it out.

In the said drawings, A and B represent two pieces of conducting water-pipe, the abutting ends *a b* of which are cut off square and are brought together at *d* within the shell or coupling C. This coupling is cast of any suitable metal, as of iron or brass, and of such a form and size that while it fits closely to the pipe at the part where the pipe is inserted in it, as at *c*, Figs. 1 and 2, there may be a sufficient space between the two ends of the pipes at their joint *d* and the shell to receive a sufficient quantity of the cement used to render the joint tight and firm. The form of the shell will vary with the kind of pipe to which it is applied, the kind of cement used, and the nature of the strain to which the joint is expected to be subjected. The spherical form shown in the drawings I have found to answer in most cases, though the space *f*, into which the cement is poured through the hole *i*, is larger than will generally be required. Where a considerable strain is to be applied to the pipes A and B, tending to pull them away from each other, the pipes may be grooved or roughened near the end, as at *m*, to give the cement a better hold. Where the axes of the two pipes do not coincide, the form of the shell C must be varied. For example, in Fig. 3 the two pipes are at right angles and abut with a miter-joint *n*, or where the pipes are to be connected in a vertical position to hole through which the cement is to be poured they may be near one end of the shell, as at *o*, Fig. 3.

There are many positions in which my improved pipe-coupling will be found to be very convenient—for example, in mending water or gas pipes which have burst—as the pipe may be cut off square and the two ends be inserted in the shell C; or a short section of pipe may be introduced without lifting the adjacent pipes at either end. In some cases, however, I propose to make the shell C in two pieces, as shown in Fig. 4, each half having a flange *l* on it, so that they may be placed over the broken pipe without cutting it, and the flanges be secured together by screw-bolts and nuts. I also propose in some cases to form a lip or projection around the hole *i*, as in Fig. 5, for the greater convenience of introducing the cement. Where this coupling is applied to plumbers' lead pipes, the space $f$ may be filled with lead or solder.

What I claim as my invention, and desire to secure by Letters Patent, is—

The above-described coupling C for conducting-pipes, the coupling fitting closely to the pipe at its ends and having a hole $i$, through which cement or other packing is introduced into the space $f$, as set forth.

ROBT. HALE.

Witnesses:
 THOS. R. ROACH,
 P. E. TESCHEMACHER.